United States Patent Office 3,845,137
Patented Oct. 29, 1974

3,845,137
PROCESS FOR THE PRODUCTION OF POLY-
FUNCTIONAL AROMATIC ALDEHYDES
Jules Magder, Princeton, N.J., assignor to Princeton
Chemical Research Inc., Princeton, N.J.
No Drawing. Filed June 15, 1972, Ser. No. 263,146
Int. Cl. C07c 45/02
U.S. Cl. 260—599    8 Claims

ABSTRACT OF THE DISCLOSURE

A process for the selective production of aromatic aldehydes in high yield by subjecting the corresponding alkyl benzene to a vapor phase oxidation in the presence of a tungsten-molybdenum oxide catalyst wherein the tungsten to molybdenum ratio varies between 1:1 and 20:1 is improved by employing the catalyst in a form such that its initial surface area is at least 2 square meters per gram.

BACKGROUND OF THE INVENTION

Polyfunctional aromatic aldehydes have been produced in the past as a by-product of the oxidation of alkyl benzenes using various catalysts and catalyst systems. However, the prior art procedures were highly undesirable since mixtures of aldehydes and acids including other undesirable by-products were obtained. Consequently, in view of the mixture of products obtained, the yields of the desired polyfunctional aromatic aldehydes were not only low but in addition, the isolation of the desired aldehyde product was complicated and therefore, the prior art procedures were not feasible from an economic point of view.

My co-worker, William F. Brill, discovered that polyfunctional aromatic aldehydes could be selectively obtained in high yield by a simple and practical procedure which involved subjecting the alkyl benzene to a vapor phase oxidation in the presence of a catalyst mixture of oxides of tungsten and molybdenum wherein the tungsten to molybdenum ratio varied between 1:1 and 20:1. This process is described in United States Patent 3,597,485, which is hereby incorporated by reference. The Brill process is a substantial and significant improvement over the prior art processes. The desired aldehyde product is selectively obtained in substantially high yield with only minor amounts of by-products thereby avoiding the difficulties associated with the prior art procedures insofar as the separation and recovery of the desired product is concerned. As a result, the Brill process is a highly desirable one insofar as economic considerations are concerned.

While the Brill process is a substantial and significant improvement over the prior art processes, it has been observed that the catalyst used in that process slowly loses its activity when the process is continuously run over an extended period of time. As a result, it is necessary to interrupt the manufacturing process periodically in order to replace the spent catalyst with new catalyst or replace the catalyst bed completely. It is apparent that the necessity of periodically interrupting the manufacture is economically undesirable.

Accordingly, it is the object of this invention to provide an improved process for the production of polyfunctional aromatic aldehydes in which the catalyst remains active for a longer period of time so that the frequency of the periodic replacement of spent catalyst is reduced. This and other objects of the invention will become apparent to those of ordinary skill in the art from the following detailed description.

SUMMARY OF THE INVENTION

The present invention relates to an improved process for the production of polyfunctional aromatic aldehydes. More particularly, the invention relates to an improved process for the selective production of an aromatic aldehyde in high yield by subjecting the corresponding alkyl benzene to a vapor phase oxidation in the presence of a tungsten-molybdenum oxide catalyst wherein the catalyst to molybdenum ratio varies between 1:1 and 20:1 by employing the catalyst in a form such that its initial surface area is at least about 2 square meters per gram. In one aspect of this invention, the catalyst is employed in the form of a mixture of the catalytic oxides supported on a catalyst carrier having a surface area of greater than about 1 square meter per gram. In another aspect of the invention, the catalyst is employed in the form of a mixture of the catalytic oxides together with at least one-third metal or metal oxide.

DESCRIPTION OF THE PREFERRED EMBODIMENTS

In accordance with the present invention, alkyl benzenes are selectively converted to the corresponding polyfunctional aromatic aldehydes by subjecting the corresponding compound to a vapor phase oxidation in the presence of a catalyst mixture of the oxides of tungsten and molybdenum, the tungsten to molybdenum ratio varying between about 1:1 and about 20:1, and the catalyst being employed in a form such that its initial surface area is at least about 2 square meters per gram. The alkyl benzenes employed are the polyalkyl substituted benzenes such as the ortho-, meta- and para-xylenes, pseudo cumene, and the like.

The tungsten to molybdenum ratio in the catalyst varies broadly between about 1:1 and about 20:1, with a preferred ratio between about 6:1 and about 20:1 and an optimum ratio of about 9:1. The catalyst can either be unsupported, i.e., in the form of pellets, or supported by a suitable catalyst support. Typical supports include Alundum, an aluminum oxide also referred to as alpha-alumina, obtained by fusing bauxite in the electric furnace; a silicon compound such as, for example, silicon carbide, silicon dioxide, and the like. Usually, the percentage actives on the carrier is 10% or less.

The improvement in the Brill process is obtained by employing the catalyst in a form such that its surface area is greater than about 2 square meters per gram when freshly prepared. The surface area is preferably less than about 10 square meters per gram when freshly prepared and on extended operation, the surface area of the catalyst preferably does not decrease below about 1 square meter per gram.

The catalyst in a form such that its initial surface area is at least 2 square meters per gram can be obtained either by using a catalyst carrier which has a surface area greater than about 1 square meter per gram or by adding at least one third metal or metal oxide to the catalyst composition. Of course, the catalyst in the desired form can be obtained by using both a catalyst carrier having a surface area greater than about 1 square meter per gram and adding at least one third metal or metal oxide to the catalyst composition. The metals or metal oxides which are useful in this invention include calcium, barium, titanium, zirconium, hafnium, niobium, zinc, thallium and tin. The third metal to molybdenum ratio can be from about 0.01:1 to about 0.5:1. A preferred third metal to molybdenum mole ratio is about 0.03:1 to 0.3:1 and the optimum ratio is 0.1:1.

The catalysts used in the present process are preferably prepared by interracting an aqueous solution containing ammonium paratungstate, ammonium molybdate, and if used, the inert catalyst support and a soluble compound of the third metal. Other soluble salts of tungsten and molybdenum, such as ammonium metatungstate and the oxalates or tartrates of tungsten and molybdenum, can also be used. The soluble compound can be, for example, barium acetate; barium nitrate; calcium nitrate; zinc nitrate; zinc sulfate; zirconium nitrate; zirconium tartrate; basic zirconyl carbonate; stannous sulfate; niobium oxalate; the calcium, barium, zirconium, hafnium, titanium and thallium salts of ethylenediamine tetraacetic acid; and the like. The amounts of paratungstate, molybdate and soluble compounds used will obviously depend upon the ratio of tungsten:molybdenum:third metal desired.

The temperature used in the present process can vary between about 400° and 700° C. The preferred range is between about 550° and 650° C., and most preferably about 575° to 625° C. The reaction is usually conducted at atmospheric pressure. If desired, the pressure can be increased which will result in speeding up the process.

The contact times throughout the catalyst bed are of the order of about 0.01 to about 10 seconds with the preferred contact time varying between about 0.1 and about 0.2 second.

The usual and preferred source of oxygen is air although nitrogen, steam, carbon dioxide and the like can be used as a diluent.

The following Examples serve to further illustrate the invention but are not intended to limit it. Throughout this specification and claims, all parts are by weight and temperatures in degrees centigrade unless otherwise indicated.

Examples 1–5

Para-xylene was oxidized into terephthaldehyde in a reactor which was a 3 foot long, 1 inch diameter stainless steel tube with heat supplied through a brass block heater. The reactor was charged with approximately 80 ml. of catalyst thereby producing a catalyst bed of about 12 inches. Air was introduced through a flow controller, measured on a rotometer and mixed with the p-xylene entering the inlet of the reactor. The p-xylene was pumped by means of a metering pump.

The temperature of the brass heater block was controlled and the temperature of the catalyst bed measured by means of a thermocouple which could be moved into a ¼ inch diameter well extending through the center of the reactor tube. The gaseous effluent from the reactor was condensed in receivers cooled in a Dry-Ice bath, and the product yield and unconverted xylene were analyzed by gas chromatography.

In each of the Examples, the catalyst was loaded in the reactor and the brass block heater was controlled to a temperature of 575° C. A space velocity, i.e., volumes of air per (bulk) volume of catalyst bed per hour measured at 25° C. and atmospheric pressure, was 3750. One mole of p-xylene was fed to the reactor tube for every 100 moles of air fed. Product samples were taken periodically and analyzed.

In the following Table, conversion is the moles of p-xylene reacted per mole of p-xylene fed to the reactor and selectivity is the moles of product obtained per mole of p-xylene reacted.

Five catalysts were prepared by dissolving 60.88 grams of ammonium metatungstate and 4.75 grams of ammonium molybdate in 200 milliliters of deionized water with stirring for 10–15 minutes at room temperature. The resulting impregnating solution was added to a 1 liter flask containing 500 grams of ⅛ inch Norton SA5103 pellets, an alpha-alumina having a surface area of 0.64 m.$^2$/g. The flask was then evacuated on a rotary evaporator at 25°–85° C. over a period of 1.5 hours. Thereafter, the impregnated carrier was heated in an oven at 200° C. for 2 hours and then in a muffle furnace at 500° C. for 2 hours.

In catalysts 2–5, a modifying additive was dissolved in the deionized water before the metatungstate and molybdate were dissolved therein. The modifying additive and amount used were:

| Catalyst No. | Modifying Additive |
|---|---|
| 2 | 0.685 g. anhydrous barium acetate. |
| 3 | 0.635 g. calcium nitrate tetrahydrate. |
| 4 | 0.800 g. zinc nitrate hexahydrate. |
| 5 | 0.483 g. 21% zirconium nitrate in water solution. |

Each of the 5 catalysts prepared contained about 10% actives, expressed as the oxides, on an alpha-alumina support.

The following Table shows the catalyst used and the active compositions thereof expressed as the atomic ratio of the metal elements indicated, the initial and final surface area of the catalyst, the initial and final conversion of the p-xylene, the total number of days of continuous operation, the number of days for the initial conversion to decrease to 40% and the initial and final terephthaldehyde selectivity.

TABLE

| Example No. | Catalyst actives composition | Initial conversion, percent | Days for conversion to decrease to 40% | Total days run | Final conversion, percent | Surface area, m.$^2$/g. | | Terephthaldehyde selectivity, percent | |
|---|---|---|---|---|---|---|---|---|---|
| | | | | | | Fresh | Final | Initial | Final |
| 1 | W/Mo=9/1 | 87 | 13 | 44 | 39 | 1.5 | 0.75 | 32 | 47 |
| 2 | W/Mo/Ba=9/1/0.1 | 87 | 21 | 26 | 37 | 1.5 | 0.80 | 29 | 42 |
| 3 | W/Mo/Ca=9/1/0.1 | 97 | 40 | 41 | 39 | 2.6 | 1.1 | 28 | 46 |
| 4 | W/Mo/Zn=9/1/0.1 | 89 | 34 | 34 | 40 | 2.1 | 0.81 | 32 | 48 |
| 5 | W/Mo/Zr=9/1/0.03 | 93 | 28 | 28 | 42 | 2.1 | 1.3 | 33 | 43 |

In Example 5, the production run was discontinued before the conversion had decreased to 40%. After 28 days, the conversion was still 42%.

The foregoing results show that the catalyst modified with calcium, zinc and zirconium which had an initial surface area of more than 2 square meters per gram were considerably more stable than the unmodified composition of Example 1 which had a surface area of less than 2 square meters per gram, as evidenced by the longer time required for the conversion to decrease to 40%. Example 2 illustrates that modifying the catalyst without increasing the surface area of the fresh catalyst does not result in the significantly increased stability which is a characteristic of the present invention, although some improvement in stability is observed.

It is evident from the foregoing data that the Brill process (Example 1) has been altered so as to increase the efficiency of the basic process without destroying the basic characteristics of that process. Thus, by increasing the surface area of the freshly prepared catalyst to at least 2 square meters per gram, it has been possible to increase the number of days required for the initial conversion to decrease to 40% by at least 200%.

Example 6

The procedure of Examples 1–5 was repeated at a reactor temperature of 575° C. and a space velocity of 2750 with the catalysts set forth in the following table and the conversion percentage monitored.

| Catalyst | | Percent conversion after— | | Fresh surface area, m.²/g. | Days for conversion to decrease to 40% |
|---|---|---|---|---|---|
| Modifier | Atomic ratio W/Mo/ modifier | 1 day | 10 days | | |
| None | 9/1/0 | 69 | 44 | 1.5 | 13 (extrapolated). |
| Na | 9/1/0.1 | 64 | 43 | 1.1 | 13. |
| K | 9/1/0.1 | 61 | 40 | 1.2 | 10. |
| Zr | 9/1/0.1 | 90 | 64 | 2.1 | >100 (extrapolated). |
| Zr | 9/1/0.03 | 80 | 53 | 2.1 | 44. |
| Ca | 9/1/0.1 | 82 | 56 | 2.6 | 45 (extrapolated). |

Example 7

A catalyst was prepared having about 10% actives, expressed as the oxides, of W/Mo/Zr in an atomic ratio of 9/1/0.1, on Norton SA5103 alpha-alumina pellets. The freshly prepared catalyst had a surface area of 5.1 m.²/g. Terephthaldehyde was prepared using the catalyst over a period of 104 days under the following conditions:

| Days at— | Conditions | | Percent conversion | |
|---|---|---|---|---|
| | Temp., °C. | Space velocity, hr.⁻¹ | Initial | Final |
| 16 | 575 | 3,750 | 89 | 70 |
| 8 | 550 | 3,750 | 49 | 48 |
| 10 | 590 | 3,750 | 77 | 76 |
| 8 | 610 | 3,750 | 85 | 80 |
| 3 | 625 | 3,750 | 89 | 87 |
| 61 | 625 | 7,500 | 80 | 46 |

Example 8

Terephthaldehyde is selectively produced in high yield employing the reaction conditions of the foregoing Examples when the catalyst mixture is tungsten and molybdenum in a ratio of 9/1 supported on LA3035 (Δ,θ,α-alumina). The catalyst is about 10% actives, expressed as the oxides, and has a surface area of 43.0 m.²/g.

Various changes and modifications can be made in the process of the present invention without departing from the spirit and the scope thereof. The various embodiments disclosed herein serve to further illustrate the invention but were not intended to limit it. For example, it is apparent that the p-xylene can be replaced by o-xylene or m-xylene to obtain the corresponding dialdehydes or by pseudo cumene to obtain triformyl benzene.

What is claimed is:

1. In a process for selectively preparing a poly-functional aldehyde by subjecting the corresponding alkyl benzene to a vapor phase oxidation in the presence of a supported catalyst mixture of oxides of tungsten and molybdenum wherein the tungsten metal to molybdenum metal mol ratio is 1:1 to 20:1, the improvement which comprises employing said supported catalyst in a form such that its initial surface area is at least about 2 square meters per gram and less than about 10 square meters per gram wherein said form is a mixture of oxides of tungsten and molybdenum and at least one-third metal or metal oxide, said third metal being selected from the group consisting of calcium, barium, titanium, zirconium, hafnium, thallium, niobium, zinc, tin and mixtures thereof.

2. The process of claim 1 wherein the third metal to molybdenum metal mole ratio is about 0.01:1 to about 0.5:1.

3. The process of claim 2 wherein the tungsten metal to molybdenum metal mole ratio is between about 6:1 and 20:1 and the third metal to molybdenum metal mole ratio is about 0.03:1 to 0.3:1.

4. The process of claim 3 wherein the oxidation is conducted at a temperature between about 400°–700° C. and wherein the contact time is about 0.01–10 seconds.

5. The process of claim 4 wherein the alkyl benzene is p-xylene and terephthaldehyde is selectively produced in the oxidation reaction, the oxidation is conducted at a temperature between about 550° and 650° C., the contact time is between 0.1 and 0.2 second, the tungsten metal to molybdenum mole ratio is about 9:1 and wherein the third metal to molybdenum metal ratio is about 0.1:1.

6. The process of claim 1 wherein the alkyl benzene is xylene or pseudo cumene.

7. The process of claim 1 wherein the alkyl benzene is pseudo cumene.

8. In a process for selectively preparing a poly-functional aldehyde by subjecting the corresponding alkyl benzene to a vapor phase oxidation in the presence of a supported catalyst mixture of oxides of tungsten and molybdenum wherein the tungsten metal to molybdenum metal mol ratio is 1:1 to 20:1, the improvement which comprises supporting said mixture of oxides of tungsten and molybdenum on an Δ,θ,α-alumina support, said supported catalyst having an initial surface area of 43 square meters per gram.

References Cited

UNITED STATES PATENTS 3,597,485  8/1971  Brill _____ 260—599
2,422,172  6/1947  Smith et al. _____ 260—683.3

OTHER REFERENCES

Griffith et al., Catalysis (3rd Ed.) (1957) pages 169–175.

BERNARD HELFIN, Primary Examiner